United States Patent
Fullwood et al.

(10) Patent No.: US 6,797,294 B2
(45) Date of Patent: Sep. 28, 2004

(54) CONFECTIONERY

(75) Inventors: Graham J Fullwood, Kwazulu Natal (ZA); Gillian R King, Gauteng Province (ZA)

(73) Assignee: Beacon Sweets & Chocolates Ltd. (ZA)

( * ) Notice: Subject to any disclaimer, the term of this patent is extended or adjusted under 35 U.S.C. 154(b) by 222 days.

(21) Appl. No.: 10/214,848

(22) Filed: Aug. 8, 2002

(65) Prior Publication Data

US 2004/0028783 A1 Feb. 12, 2004

(51) Int. Cl.$^7$ ................................................ A23G 3/00
(52) U.S. Cl. .................. 426/91; 426/103; 426/134; 426/660
(58) Field of Search .................. 426/91, 103, 134, 426/660, 512, 519

(56) References Cited

U.S. PATENT DOCUMENTS

| | | | | |
|---|---|---|---|---|
| 3,012,893 A | * | 12/1961 | Kremzner et al. | 426/572 |
| 3,554,766 A | * | 1/1971 | Engel | 426/307 |
| 3,985,909 A | * | 10/1976 | Kirkpatrick | 426/572 |
| 4,317,839 A | * | 3/1982 | Mitchell et al. | 426/96 |
| 4,741,905 A | * | 5/1988 | Huzinec | 426/3 |
| 5,993,870 A | * | 11/1999 | Hoeting et al. | 426/110 |
| 6,177,110 B1 | * | 1/2001 | Chan | 426/90 |
| 6,187,352 B1 | * | 2/2001 | Crosbie | 426/104 |
| 6,345,977 B1 | * | 2/2002 | Chan | 425/338 |
| 6,558,727 B2 | * | 5/2003 | Degady et al. | 426/516 |
| 6,592,928 B2 | * | 7/2003 | Makela et al. | 426/660 |

* cited by examiner

*Primary Examiner*—N. Bhat
(74) *Attorney, Agent, or Firm*—Baker Botts, LLP

(57) ABSTRACT

A process for the manufacture of an item of confectionery includes the steps of: boiling a glucose and sugar mixture to produce a boiled sugar mass; admixing at least one nonpareil to the boiled sugar mass; and forming the admixture into a predetermined desired shape. The invention extends to an item of confectionery.

33 Claims, 1 Drawing Sheet

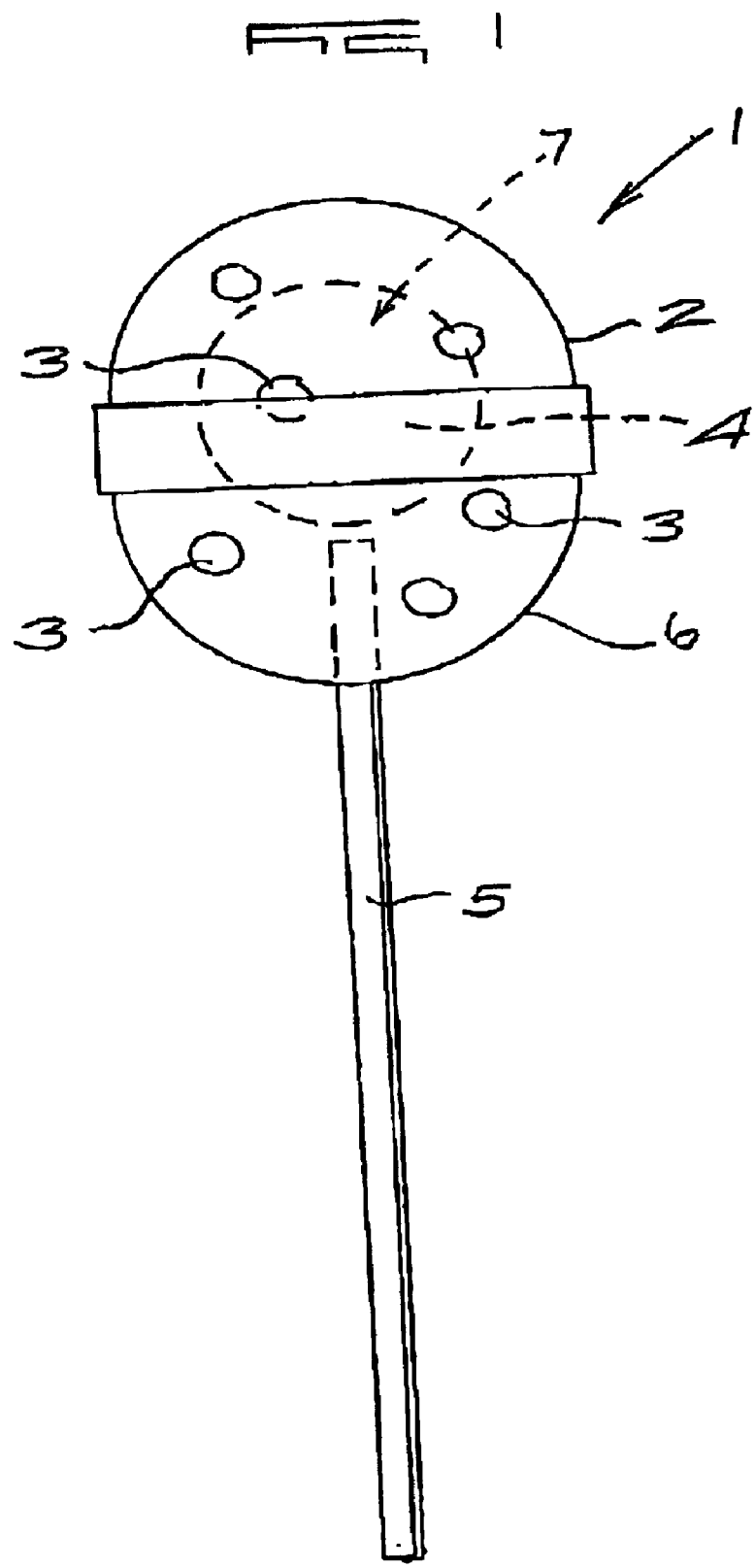

CONFECTIONERY

FIELD OF THE INVENTION

This invention relates to an item of confectionery and, more particularly, to an item of confectionery which is aesthetically pleasing and appealing to consumers, particularly children. The invention extends to a process for the manufacture of the item of confectionery.

BACKGROUND TO THE INVENTION

Confectionery such as boiled sweets, lollipops and the like are generally made by a process which involves the steps of boiling a sugar and glucose mixture, coloring and flavoring the cooked sugar mass, and die forming the colored and flavored cooked sugar mass into a desired shape. It is also known to inject or fold a fizzy constituent such as sherbet into the centre of the boiled sugar mass, and to introduce pop sticks into the formed shapes to produce lollipops.

It is also known to produce nonpareils for use in cooking, and the manufacture of confectionery, by means of a standard hard or soft sugar panning process in which a core, which may be a sugar crystal or a compressed tablet, is built up in bulk and volume by the addition of saturated sugar syrup in a rotating pan. Excess water is evaporated to form a hard sugar shell. This process is repeated until a desired target size and weight is achieved, typically between four to six millimeters in diameter. The nonpareils are flavored as required.

In this specification the word "nonpareil" shall be given an extended meaning to include a small sugar-based item of confectionery by whatever means it is manufactured.

OBJECT OF THE INVENTION

It is an object of this invention to produce a novel item of confectionery, and a method of manufacturing the novel item of confectionery that combines the abovementioned processes.

SUMMARY OF THE INVENTION

According to a first aspect of the invention there is provided a process for the manufacture of an item of confectionery, the process including the steps of boiling a glucose and sugar mixture to produce a boiled sugar mass; admixing at least one nonpareil to the boiled sugar mass; and forming the admixture into a predetermined desired shape.

The process may include the further steps of coloring and flavoring the boiled sugar mass.

The process may include the still further step of introducing a fizzy constituent into a central region of the admixture. The fizzy constituent may be a sherbet. The sherbet may be introduced by means of injection. Instead, the sherbet may be introduced by means of folding.

The process may include the still further step of introducing a pop stick into the formed shape.

There may be a plurality of nonpareils and the process may include mechanically vibrating the nonpareils into the boiled sugar mass in a continuous process. Instead, the process may include admixing the nonpareils into the boiled sugar mass by hand in a batch process.

Preferably, the formed boiled sugar mass is translucent or transparent. The, or each, nonpareil may be of a color which differs from that of the boiled sugar mass. Further, the, or each, nonpareil may have a plurality of differently colored layers. Preferably, the, or each, nonpareil is between four and six millimeters in overall width.

The, or each, nonpareil may be manufactured by means of a hard sugar panning process.

Instead, the, or each, nonpareil may be manufactured by the steps of binding sugar, at least one colorant and at least one flavorant with a gum; forming the bound constituents to a predetermined desired shape; and drying the formed and bound constituents to a desired hardness.

The forming of the bound constituents may be by means of stamping. Instead, the forming of the bound constituents may be by means of tabletting. Further instead, the forming of the bound constituents may be by means of die forming.

According to a second aspect of the invention there is provided an item of confectionery produced by the process described above.

The at least one nonpareil in the item of confectionery may be visible as an inclusion in a shell of the item of confectionery. Preferably, the formed boiled sugar mass is translucent or transparent. The, or each, nonpareil may be of a color which differs from that of the boiled sugar mass. The item of confectionery may include a plurality of nonpareils that are visible as inclusions, and the nonpareils may be differently colored. Each of the nonpareils may have a plurality of differently colored layers.

According to a further aspect of the invention there is provided an item of confectionery including a solidified boiled sugar mass having at least one nonpareil as an inclusion therein. Thus, the at least one nonpareil may be visible as a suspended inclusion in the formed boiled mass.

The boiled sugar mass may comprise a boiled mixture of a glucose and sugar. The mixture includes a colorant and a flavorant.

The solidified boiled sugar mass may be shaped to provide a shell having a cavity defined therein and the item of confectionery may include a fizzy constituent located in the cavity of the shell. The fizzy constituent may be a sherbet.

The item of confectionery may include a pop stick attached to the solidified boiled sugar mass.

Preferably, the formed boiled sugar mass is translucent or transparent. The, or each, nonpareil may be of a color which differs from that of the boiled sugar mass. Further, the, or each, nonpareil may be of a color which differs from that of the boiled sugar mass. Still further, the, or each, nonpareil may have a plurality of differently colored layers. Still further, the, or each, nonpareil may be between four and six millimeters in width.

BRIEF DESCRIPTION OF THE DRAWINGS

One embodiment of the invention is described below, by way of example only, and with reference to the accompanying drawing, which shows a perspective view of an item of confectionery in accordance with the invention.

DETAILED DESCRIPTION OF THE INVENTION

The invention will be described with particular reference to its application in the production of an item of confectionery in the form of a lollipop. It is to be clearly understood, however, that the scope of the invention is not limited to this particular application.

In the drawing, an item of confectionery in the form of a lollipop is indicated generally by reference numeral (1).

The lollipop (1) has a head (6) comprising a translucent shell (2) made from a boiled sugar mass and defining a central cavity (7), a number of spherical nonpareils (3) visible as inclusions in the translucent shell (2), and a central core (4) of a fizzy constituent such as sherbet. Further, the lollipop (1) has a pop stick (5) attached to and projecting outwardly from the translucent shell (2). The nonpareils (3) are brightly colored and flavored in a flavor different from that of the shell (2). This combination of elements provides an effect of a pale colored confection with flavored, brightly colored, and contrasting visible spheres.

The translucent shell (2) is produced by a conventional process which is well known in the art, and which includes the steps of:

boiling a glucose and sugar mixture to produce a boiled sugar mass;

coloring and flavoring the boiled sugar mass as desired, the colored boiled sugar mass being translucent;

injecting or folding a quantity of sherbet (4) into the centre of the boiled sugar mass;

forming the boiled sugar mass and the sherbet (4) into the shape of the translucent shell (2) of the lollipop (1), and introducing a pop stick (5) into the formed shape to cause a portion of the pop stick (5) to project outwardly therefrom.

The process of manufacture of the lollipop (1) includes an additional step of admixing a plurality of nonpareils (3) to the boiled sugar mass prior to the forming thereof into the desired shape of the lollipop head (6).

In order to achieve production efficiencies, the plurality of nonpareils (3) may be admixed to the boiled sugar mass in a continuous process by mechanically vibrating the nonpareils (3) into the boiled sugar mass on a moving belt or the like. Where production efficiency is not a prime consideration, it will be appreciated by those skilled in the art that the plurality of nonpareils (3) may be admixed into the boiled sugar mass by hand in a batch process.

The nonpareils (3) are produced by a conventional process which is well known in the art, and which includes the steps of: building up a core, such as a sugar crystal or a compressed tablet, in bulk and volume by the adding saturated sugar syrup to a rotating pan; evaporating excess water from the bulked-up core to form a hard sugar crystal shell; repeating the above steps until a desired target size and weight is achieved; and flavoring the nonpareil.

Typically, the nonpareils (3) are between four to six millimeters in diameter. In order to add to the novelty of the lollipop (1), the nonpareils (3) are produced by means of the process described above to have a number of differently colored layers.

It will be appreciated by those skilled in the art that as the translucent shell (2) of the lollipop (1) is consumed, the differently colored nonpareils (3) become exposed. As a consumer sucks the lollipop (1) further, the nonpareils (3) themselves are consumed to sequentially expose the differently colored layers, thereby retaining the consumer's interest in the changing appearance of the lollipop (1). This process continues until the sherbet core (4) of the lollipop (1) is reached.

Numerous modifications are possible to this embodiment without departing from the invention. In particular, the confection may be in the form of a boiled sweet instead of a lollipop. Further, the nonpareils (3) may have shapes other than spheres, for example, stars, crescents, animals, fish, and the like. Still further, the nonpareils (3) may be made by other process such as binding sugars, colorants and flavorants with a binder, such as gum, and forming the bound constituents by any one of the steps of stamping, tabletting or die forming, and drying the formed sugar to produce nonpareils (3) of a desired hardness.

The invention therefore provides a confection that will be aesthetically pleasing to consumers and which will retain a consumer's interest during consumption thereof.

What is claimed is:

1. A process for the manufacture of an item of confectionery, the process including the steps of boiling a glucose and sugar mixture to produce a boiled sugar mass;

admixing at least one nonpareil to the boiled sugar mass; and forming the admixture into a predetermined desired shape.

2. The process as claimed in claim 1, which includes the further steps of coloring and flavoring the boiled sugar mass.

3. The process as claimed in claim 1 or claim 2, which includes the further step of introducing a fizzy constituent into a central region of the admixture to be formed.

4. The process as claimed in claim 3, in which the fizzy constituent is a sherbet.

5. The process as claimed in claim 4, in which the sherbet is introduced by means of injection.

6. The process as claimed in claim 4, in which the sherbet is introduced by means of folding.

7. The process as claimed in claim 1, which includes the still further step of introducing a pop stick into the formed shape.

8. The process as claimed in claim 1, in which there is a plurality of nonpareils and the process includes mechanically vibrating the nonpareils into the boiled sugar mass in a continuous process.

9. The process as claimed in claim 1, in which there is a plurality of nonpareils and the process includes admixing the nonpareils into the boiled sugar mass by hand in a batch process.

10. The process as claimed in claim 1, in which the formed boiled sugar mass is translucent.

11. The process as claimed in claim 1, in which the, or each, nonpareil is of a color which differs from that of the boiled sugar mass.

12. The process as claimed in claim 1, in which the, or each, nonpareil has a plurality of differently colored layers.

13. The process as claimed in claim 1, in which the, or each, nonpareil is between four and six millimeters in width.

14. The process as claimed in claim 1, in which the, or each, nonpareil is manufactured by means of a hard sugar panning process.

15. The process as claimed in claim 1, in which the, or each, nonpareil is manufactured by the steps of binding sugar, at least one colorant and at least one flavorant with a gum;

forming the bound constituents to a predetermined desired shape; and drying the formed and bound constituents to a desired hardness.

16. The process as claimed in claim 15, in which the forming of the bound constituents is by means of stamping.

17. The process as claimed in claim 15, in which the forming of the bound constituents is by means of tabletting.

18. The process as claimed in claim 15, in which the forming of the bound constituents is by means of die forming.

19. An item of confectionery produced by the process of claim 1.

20. The item of confectionery as claimed in claim 19, in which the formed boiled sugar mass is translucent.

21. The item of confectionery as claimed in claim 20, in which the at least one nonpareil in the item of confectionery is visible as an inclusion in a shell of the item of confectionery.

22. The item of confectionery as claimed in claim 21, which includes a plurality of nonpareils that are visible as inclusions, and in which each of the nonpareils is of a color which differs from that of the formed boiled sugar mass.

23. The item of confectionery as claimed in claim 22, in which each of the nonpareils has a plurality of differently colored layers.

24. An item of confectionery including a solidified boiled sugar mass having at least one nonpareil as an inclusion therein.

25. The item of confectionery as claimed in claim 24, in which the sugar mass comprises a mixture of a glucose and sugar.

26. The item of confectionery as claimed in claim 25, in which the mixture includes a colorant and a flavorant.

27. The item of confectionery as claimed in claim 26, in which the solidified boiled sugar mass is shaped to provide a shell having a cavity defined therein and which includes a fizzy constituent located in the cavity of the shell.

28. The item of confectionery as claimed in claim 27, in which the fizzy constituent is a sherbet.

29. The item of confectionery as claimed in claim 28, which includes a pop stick attached to the solidified boiled sugar mass.

30. The item of confectionery as claimed in claim 24, in which the solidified boiled sugar mass is translucent.

31. The item of confectionery as claimed in claim 30, in which the, or each, nonpareil is of a color which differs from that of the solidified boiled sugar mass.

32. The item of confectionery as claimed in claim 31, in which the, or each, nonpareil has a plurality of differently colored layers.

33. The item of confectionery as claimed in claim 24, in which the, or each, nonpareil is between four and six millimeters in width.

* * * * *